(12) United States Patent
Drabenstott et al.

(10) Patent No.: US 7,146,487 B2
(45) Date of Patent: Dec. 5, 2006

(54) METHODS AND APPARATUS TO SUPPORT CONDITIONAL EXECUTION IN A VLIW-BASED ARRAY PROCESSOR WITH SUBWORD EXECUTION

(75) Inventors: Thomas L. Drabenstott, Cary, NC (US); Gerald George Pechanek, Cary, NC (US); Edwin Franklin Barry, Vilas, NC (US); Charles W. Kurak, Jr., Durham, NC (US)

(73) Assignee: Altera Corporation, San Jose, CA (US)

(*) Notice: Subject to any disclaimer, the term of this patent is extended or adjusted under 35 U.S.C. 154(b) by 359 days.

(21) Appl. No.: 10/718,415

(22) Filed: Nov. 20, 2003

(65) Prior Publication Data

US 2004/0107333 A1 Jun. 3, 2004

Related U.S. Application Data

(63) Continuation of application No. 10/114,652, filed on Apr. 1, 2002, now Pat. No. 6,760,831, which is a continuation of application No. 09/238,446, filed on Jan. 28, 1999, now Pat. No. 6,366,999.

(60) Provisional application No. 60/072,915, filed on Jan. 28, 1998.

(51) Int. Cl.
*G06F 15/80* (2006.01)

(52) U.S. Cl. ...................................... 712/24

(58) Field of Classification Search .................. 712/24
See application file for complete search history.

(56) References Cited

U.S. PATENT DOCUMENTS 6,041,399 A * 3/2000 Terada et al. .................. 712/24

OTHER PUBLICATIONS

Mahlke et al., "Effective Compiler Support for Predicated Execution Using the Hyperblock", Proceedings of the 25th Annual Symposium on Microarchitecture, 1992, MICRO 25, Dec. 1-4, 1992, pp. 45-54.*

* cited by examiner

*Primary Examiner*—William M. Treat
(74) *Attorney, Agent, or Firm*—Priest & Goldstein, PLLC (57) ABSTRACT

General purpose flags (ACFs) are defined and encoded utilizing a hierarchical one-, two- or three-bit encoding. Each added bit provides a superset of the previous functionality. With condition combination, a sequential series of conditional branches based on complex conditions may be avoided and complex conditions can then be used for conditional execution. ACF generation and use can be specified by the programmer. By varying the number of flags affected, conditional operation parallelism can be widely varied, for example, from mono-processing to octal-processing in VLIW execution, and across an array of processing elements (PE)s. Multiple PEs can generate condition information at the same time with the programmer being able to specify a conditional execution in one processor based upon a condition generated in a different processor using the communications interface between the processing elements to transfer the conditions. Each processor in a multiple processor array may independently have different units conditionally operate based upon their ACFs.

26 Claims, 6 Drawing Sheets

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | 0 | | CC | | | Rx | | | | | | Ry | | | | | 0 | Ccombo | | | Dpack | |
| | | | | | CMPcc | | | | | | | | | | Rxe | | | | | | Rye | | | | | 0 | | | | | |

| CC | Description | C-N-V-Z Setting |
|---|---|---|
| Z(EQ) | Zero or Equal | Z=1 |
| NZ(NE) | Not Zero or Not Equal | Z=0 |
| HI | Higher (unsigned) | (C=1)&&(Z=0) |
| HS(CS) | Higher or Same (unsigned, or Carry Set) | C=1 |
| LO(CC) | Lower (unsigned, or Carry Clear) | C=0 |
| LS | Lower or Same (unsigned) | (C=0)\|\|(Z=1) |
| VS | Overflow Set | V=1 |
| VC | Overflow Clear | V=0 |
| POS | Positive | (N=0)&&(Z=0) |
| NEG | Negative | N=1 |
| GE | Greater-than or Equal (signed) | N=V |
| GT | Greater-Than (signed) | (Z=0)&&(N=V) |
| LE | Less-than or Equal (signed) | (Z=1)\|\|(N!=V) |
| LT | Less-Than (signed) | N!=V |

Load Direct Instruction Encoding

| 31 30 | 29 | 28 27 | 26 | 25 24 23 | 22 | 21 20 19 18 17 | 16 | 15 | 14 13 12 11 10 9 8 7 6 5 4 3 2 1 0 |
|---|---|---|---|---|---|---|---|---|---|
| Group | S/P | Size | 0 | Amode Load | CE1 | Rt 5-0 | | L/S | UADDR15 |

Copy Instruction Encoding

| 31 30 | 29 | 28 27 | 26 25 24 | 23 22 21 | 20 19 18 17 16 15 14 13 12 11 | 10 9 | 8 7 6 5 4 3 | 2 1 0 |
|---|---|---|---|---|---|---|---|---|
| Group | S/P | Size | DSUopcode Copy | | Rx 4-0 | Rt 4-0 | Rt 5 Rx 5 | 0 0 CopyExt | CE2 |

Logic Instruction Encoding

| 31 30 | 29 | 28 27 | 26 25 24 | 23 22 21 | 20 | 19 18 17 16 15 | 14 | 13 12 11 10 9 | 8 | 7 6 5 4 3 | 2 1 | 0 |
|---|---|---|---|---|---|---|---|---|---|---|---|---|
| Group | S/P | Unit | ALUopcode Logic Operation | Rt | Rte | Rx | Rxe | Ry | Rye | | CE3b | LogicExt |
| | | | | | 0 | | 0 | | 0 | | | |

METHODS AND APPARATUS TO SUPPORT CONDITIONAL EXECUTION IN A VLIW-BASED ARRAY PROCESSOR WITH SUBWORD EXECUTION

CROSS REFERENCE TO RELATED APPLICATIONS

This is a continuation of application Ser. No. 10/114,652 filed on Apr. 1, 2002 now U.S. Pat. No. 6,760,831 which is a continuation of application Ser. No. 09/238,446 filed on Jan. 28, 1999, now U.S. Pat. No. 6,366,999, each of which is incorporated by reference herein in its entirety.

The present application claims the benefit of U.S. Provisional Application Ser. No. Ser. 60/072,915 entitled Methods and Apparatus to Support Conditional Execution in a VLIW-Based Array Processor with Subword Execution

FIELD OF THE INVENTION

The present invention relates generally to improvements in digital processing and more particularly to methods and apparatus for supporting conditional execution in a very long instruction word (VLIW) based array processor with sub-word execution.

BACKGROUND OF THE INVENTION

Conditional execution, also referred to as predicated execution, provides the programmer the ability to specify for a non-branch type of instruction whether it is to execute or not based upon a machine state generated previously. This data-dependent conditional execution capability minimizes the need for conditional branches. By avoiding the use of branches, which incur a branch delay penalty on pipelined processors, performance is improved. In addition, it is noted that many types of sequential control dependencies can be turned into parallel data dependencies. Consequently, it is desirable that a pipelined SIMD array processor support conditional execution in each processing element (PE) to provide a level of data-dependent parallelism unavailable on a Single Instruction Multiple Data stream (SIMD) machine that only supports conditional branching. With parallel conditional execution, the performance gain can be significant since multiple conditional branches can be avoided.

In creating the architecture of a parallel array indirect VLIW processor for a given range of operations it is found that the format needed to specify the operations varies in requirements depending upon the type of operation. For example, the parallel array operations can be grouped into three types, control and branch operations, load and store operations, and arithmetic operations. Each of these types will have different encoding requirements for optimum implementation. Since the instruction format typically is of a fixed number of bits, it is difficult, without restricting functional capabilities for at least some of the operations, to define a mechanism supporting a single specification for conditional execution across all instructions in a processor. Given that it is desirable to support conditional execution, even if the degree of support must vary depending upon the instruction type, a problem is encountered on how to define a unified but variable-specification conditional execution mechanism based upon the instruction type.

For conditional branching or conditional execution to be more efficient, it is desirable that the conditional operation be based on complex conditions that are formed by a Boolean combination of relations such as [a>b OR c<d]. This may be accomplished by sequentially using multiple single-test conditional branches that effectively achieve the desired result. The problem associated with using multiple single-test conditional branches is that there is a performance decreasing effect for each branch required due to the branch delay penalty. This performance decreasing effect can be reduced with non-branching complex conditional execution.

In machines with a SIMD architecture, it is desirable to generate independent conditional operations in the PEs as well as to transfer condition information between PEs to allow the gathering of conditional state information generated in the PEs. It is also desirable to provide conditional branching in the controller, sequence processor (SP), of a SIMD array processor where the conditions are created in the array PEs. By allowing condition-state information to be moved between PEs, a condition producing operation can take place in one PE and a conditional operation based upon the conditional result to take place in another PE. By allowing conditional information to be moved between the PEs and the SP, a conditional operation can take place in the SP based upon PE conditions. How to best add such capability into the architecture raises further issues.

In VLIW machines, a plurality of execution units exist that may execute in parallel, with each execution unit possibly producing condition information or state information for each sub-instruction of the multi-instruction VLIW. To make a data dependent conditional execution decision, it is necessary to reduce the total amount of machine state to the desired test condition. It is also desirable to have a mechanism to select condition results from one of the multiple execution units to control the execution of one or more of the other execution units. An example of this type of situation is a compare instruction followed by a conditionally dependent shift instruction where the compare is performed in a different execution unit than the shift. Consequently, the problems to be solved are how to reduce the amount of condition information to a specified test condition and how to provide a mechanism for interdependent conditional execution between the multiple execution units that operate in synchronism in a VLIW machine.

Sub-word execution refers to the multiple individual operations that simultaneously take place on pieces of data smaller than a word or double word within a single execution unit. The aggregate of the multiple sub-word operations are referred to as packed data operations, where for example quad 16-bit operations or octal 8-bit operations occur in parallel on packed 64-bit data types. When performing sub-word execution in a machine that supports conditional execution, it is desirable to achieve a sub-word level of conditional execution granularity when executing the instruction. The question is how to support such a capability in the architecture.

SUMMARY OF THE INVENTION

The present invention advantageously addresses such problems, preferably utilizing a ManArray architecture, by providing a hierarchical conditional execution specification based upon instruction type, support in the controller Sequence Processor (SP) and PEs for complex conditions based upon present and previous condition state, a mechanism to distribute condition state information between the PEs and SP, a mechanism for interdependent conditional execution between the multiple execution units in a VLIW machine, and a mechanism for sub-word conditional execution.

In the ManArray architecture, as presently adapted, a three level hierarchical specification is used where one, two, or three bit conditional execution specifications are used in the instruction formats depending upon the instruction type and format encoding restrictions. The condition state to be operated upon, as specified by these bits, is a reduced set of state information separately produced from the normal side-effect state generated in parallel by executing instructions, be they packed data or VLIW operations. Conceptually, the normal side-effect state generated from an instruction execution is saved in the arithmetic scalar flags (ASFs), namely carry (C), overflow (V), sign (N), and zero (Z) flags. Some restrictions apply depending upon the data type. The separately produced conditional state is saved in the arithmetic condition flags (ACFs), namely F7-F0, where Fi corresponds to packed data element i. The ASFs can only be used for conditional branching while the ACFs are used in both conditional branching and for conditional execution. In addition, the ACFs contain state information that is set as a result of an instruction execution or set as a result of a Boolean combination of state information generated from a present compare instruction and previous instruction execution. These ACFs can be specified and tested for in the SP by conditional instructions thereby minimizing the use of conditional branches. In the simplest case, PE instructions may conditionally execute and SP instructions may conditionally execute or branch on the condition results of the immediately preceding instruction. If the immediately preceding instruction did not affect the flags, general conditional execution is based on the condition results of the last instruction that affected the ACFs or a Boolean combination of condition state information.

The ManArray, when constructed, programmed and operated in accordance with the present invention, uses the convention of the programmer specifying either how the ACFs are set by the instruction generating the condition or how to use the ACFs, rather than only specifying how to use the ACFs with an instruction operating on a condition. This convention produces a single True or False flag that contains a 1 or a 0 designated $F_n$ per operation. For compare instructions, the programmer must specify which condition state, greater-than, equal, less-than, etc., to use in setting the ACFs. In addition, compare instructions operating in the arithmetic logic unit (ALU) can specify the setting of the flags based upon a Boolean combination of the present compare result state and past instruction ACF state. For arithmetic operations, in one embodiment of the ManArray architecture in accordance with the present invention, the ability to select how to update the ACF condition flags using one of the four ASF conditions C (carry flag), V (overflow flag), N (negative flag), or Z (zero flag) on an instruction by instruction basis is advantageously provided.

When executing VLIW operations, the programmer must select which of the arithmetic units is allowed to affect the single set of ACFs. The single set of flags can be used in VLIW execution to conditionally control the execution of each of the VLIW units. During each cycle, the ownership and setting of the condition flags is dynamically determined by the instruction in execution. Conditions that occur but are not selected to affect the ACFs or that affect the programmer's visible ASFs cause no effect and are not generally saved.

Another aspect of one embodiment of the ManArray instruction set is that instructions that execute conditionally do not affect the condition flags themselves. This feature gives the programmer the ability to execute C-style conditional expression operators of the form (a>b)?z=x+y:r=q+s without worry that the first instruction after the comparison will alter the flags producing an undesired result. An instruction may either specify to conditionally execute based upon the ACFs or specify how to set the ACFs but not both.

It is desirable to have an efficient mechanism or means to generate complex conditions in each PE that can be specified and tested for by conditional instructions. This has the effect of changing SP conditional branches into PE data dependent execution operations. Having an effective means for parallel array conditional execution minimizes the need to have the PEs send condition signals back to the controller, which takes time and implementation expense, for the purposes of supporting conditional branching based on PE conditions. An implication of having parallel array conditional execution is that the approach chosen for providing PE condition feedback to the array controller can be simple in nature and less costly than providing condition signaling paths from each PE. By saving the condition flags in a programmer accessible register space that can be copied or moved to a PE's register file the flags can be easily communicated between PEs. In conjunction with a merged SP/PE as described more fully in U.S. application Ser. No. 09/169,072 filed Oct. 9, 1998 entitled Methods and Apparatus for Dynamically Merging an Array Controller with an Array Processor Blement, flags saved in PE0 are easily transferred to the SP. Using a log N reduction method, where N is the number of PEs in the array, it is possible to exchange PE flag information between all PEs in log N steps. The transfer of condition information is consistent with the design of the existing ManArray network and does not require the addition of condition signaling paths between the PEs and the SP controller.

With a need by many applications for conditional subword execution, the three bit form of conditional execution specifies, for specific instructions or specific groups of instructions, that the instruction is to operate only on the data elements of a packed data type that have a corresponding ACF of the appropriate value for the instruction specified true or false test.

These and other advantages and aspects of the present invention will be apparent from the drawings and Detailed Description which follow.

DETAILED DESCRIPTION

Further details of a presently preferred ManArray architecture for use in conjunction with the present invention are found in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998 and U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1998, Provisional Application Ser. No. 60/077,766 entitled "Register File Indexing Methods and Apparatus for Providing Indirect Control of Register in a VLIW Processor" filed Mar. 12, 1998, Provisional Application Ser. No. 60/092,130 entitled "Methods and Apparatus for Instruction Addressing in Indirect VLIW Processors" filed Jul. 9, 1998, Provisional Application Ser. No. 60/103,712 entitled "Efficient Complex Multiplication and Fast Fourier Transform (FFT) Implementation on the ManArray" filed Oct. 9, 1998, Provisional Application Ser. No. 60/106,867 entitled "Methods and Apparatus for Improved Motion Estimation for Video Encoding" filed Nov. 3, 1998, Provisional Application Serial No. 60/113,637 entitled "Methods and Apparatus for Providing Direct Memory Access (DMA) Engine" filed Dec. 23, 1998 and Provisional Application Ser. No. 60/113,555 entitled "Methods and Apparatus Providing Transfer Control" filed Dec. 23, 1998, respectively, and incorporated by reference herein in their entirety.

Figure 1:
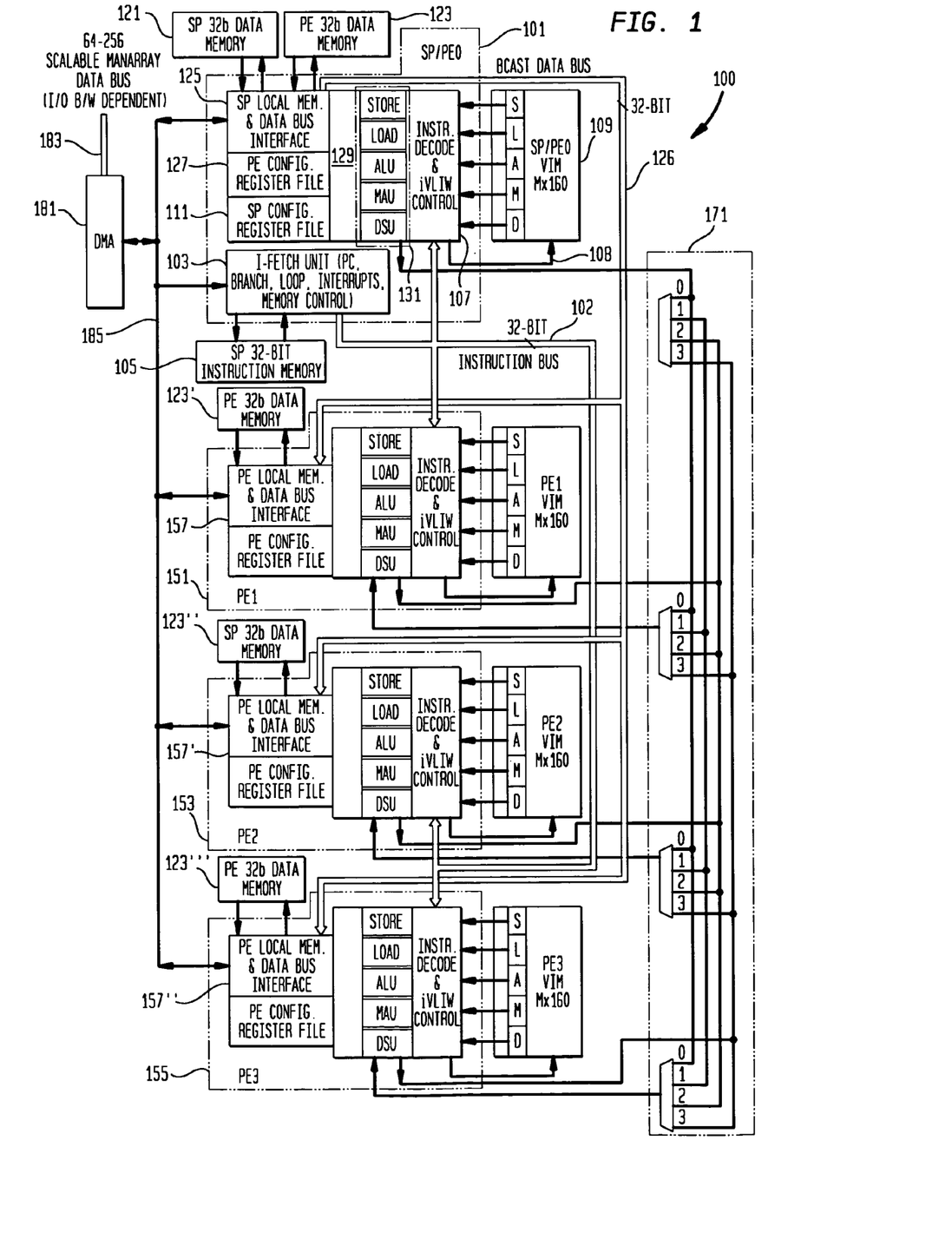
FIG. 1 illustrates a ManArray architecture suitable for use with the present invention.

In a presently preferred embodiment of the present invention, a ManArray 2×2 iVLIW Single Instruction Multiple Data stream (SIMD) processor 100 shown in FIG. 1 contains a controller Sequence Processor (SP) combined with Processing Element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate conditional execution apparatus and methods in accordance with the present invention. It is noted that the PEs can be also labeled with their matrix positions as shown in parenthesis for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing loop operations, support for interrupts, and provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs, identified by the letters SLAMD in 109, stored in the VIM. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0 the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123'', and 123''' though the data stored in them is generally different as required by the local processing done on each PE. The interface to these PE data memories is also a common design in PEs 1, 2, and 3 and indicated by PE local memory and data bus interface logic 157, 157' and 157''. Interconnecting the PEs for data transfer communications is the cluster switch 171 more completely described in U.S. patent application Ser. No. 08/885,310 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in the DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via bus 185.

All of the above noted patents are assigned to the assignee of the present invention and incorporated herein by reference in their entirety.

Turning to specific details of the ManArray processor conditional execution methods and apparatus, this approach advantageously solves the aforementioned parallel array iVLIW conditional execution problems with a simple programming model and minimal hardware requirements.

Arithmetic Condition Flags

The ManArray Architecture defines a set of Arithmetic Condition Flags (ACFs) that store specified results from instruction execution, e.g. results from a compare instruction. These ACFs are used for generalized conditional execution. In order to minimize branch latencies, almost all instructions can be conditionally executed based upon the ACFs. For an instruction to be conditionally executed in each PE in an array of PEs, a testable condition must be generated locally in each PE. This local testable condition is derived from the large number of conditions that can occur in each PE due to iVLIW execution on packed data types. For cycle-by-cycle conditional execution of an instruction stream, the instruction coding must be able to specify which conditions are employed to determine whether to execute the instructions or not. Since there are many types of conditions, four or more bits would have to be dedicated in each instruction format to do the specification properly. Since conditional branches typically specify a single condition test and it is anticipated that multimedia data dependent code will make primary use of single condition testing, it is herein assumed that a single level of conditional execution would provide the most performance gain over more complicated nested conditional execution scenarios. However, more complex nested conditions with multiple sets of condition flags are not precluded by the present teachings, although the inventive concepts discussed herein are made in the context of a single level of conditional execution. With this in mind, the programming model for ManArray conditional execution requires the specification of how the ACFs are to be set in order to reduce the amount of condition state information that results after a packed data iVLIW operation.

Two types of flags are specified: the Carry (C), Overflow (V), Sign (N), Zero (Z) are termed Arithmetic Scalar Flags (ASF) and the F7-F0 flags are termed Arithmetic Condition Flags (ACF). The programmer visible ASFs are always set after each instruction execution, as specified by the instruction, based on the least significant operation being executed on a packed data type, i.e. byte-0 (b0), Half-word-0 (H0), Word-0 (W0), or Double-word (D) and represent the traditional side effects of the operation. Branches may occur based on the condition of these scalar flags by specifying the condition in the branch operation. Table 1 gives an example of the scalar conditions which may be generated as a result of an instruction execution and as defined by the instruction:

TABLE 1

| Scalar Flag | Description |
| --- | --- |
| C—Carry | Set if the carry output from bit-31 of the arithmetic unit is 1. Cleared if carry output is 0. |
| V—Overflow | Set if the XOR of the two highest order carries (the carry into bit-31 and the carry out of bit-31) is a 1. Cleared if the XOR is a zero. This condition corresponds to a positive or negative overflow in 2's complement arithmetic. |
| N—Sign | Set if highest order bit (bit-31) of the result (sign bit) is 1. Cleared if highest order bit is 0. |
| Z—Zero | Set if the output of the operation contain all zeroes. |

Generalized conditional execution, however, is based only upon the ACFs. The ACFs are only modified by a selected set of instructions, such as compares. It is noted, however, that architecturally this execution could be extended to the majority of instructions. The generation of the ACFs by these certain instructions is not a side effect of execution but rather is specified by the programmer. The ACFs are derived, as specified in an instruction, from the side effects of execution—CNVZ—during the condition return phase of the pipeline. In addition, the ACFs are available for use by the next instruction without any wait penalty. By definition, there is one set of ACFs per SP 101 of FIG. 1 and for each PE 101, 151, 153, and 155 of FIG. 1 independent of the number of execution units in the VLIW architecture. In this manner, a condition can be generated in one execution unit, e.g. from a compare instruction in the ALU, and the other execution units can conditionally execute based upon this condition.

Condition Transfer to the ACFs

Figures 2A, 2B:
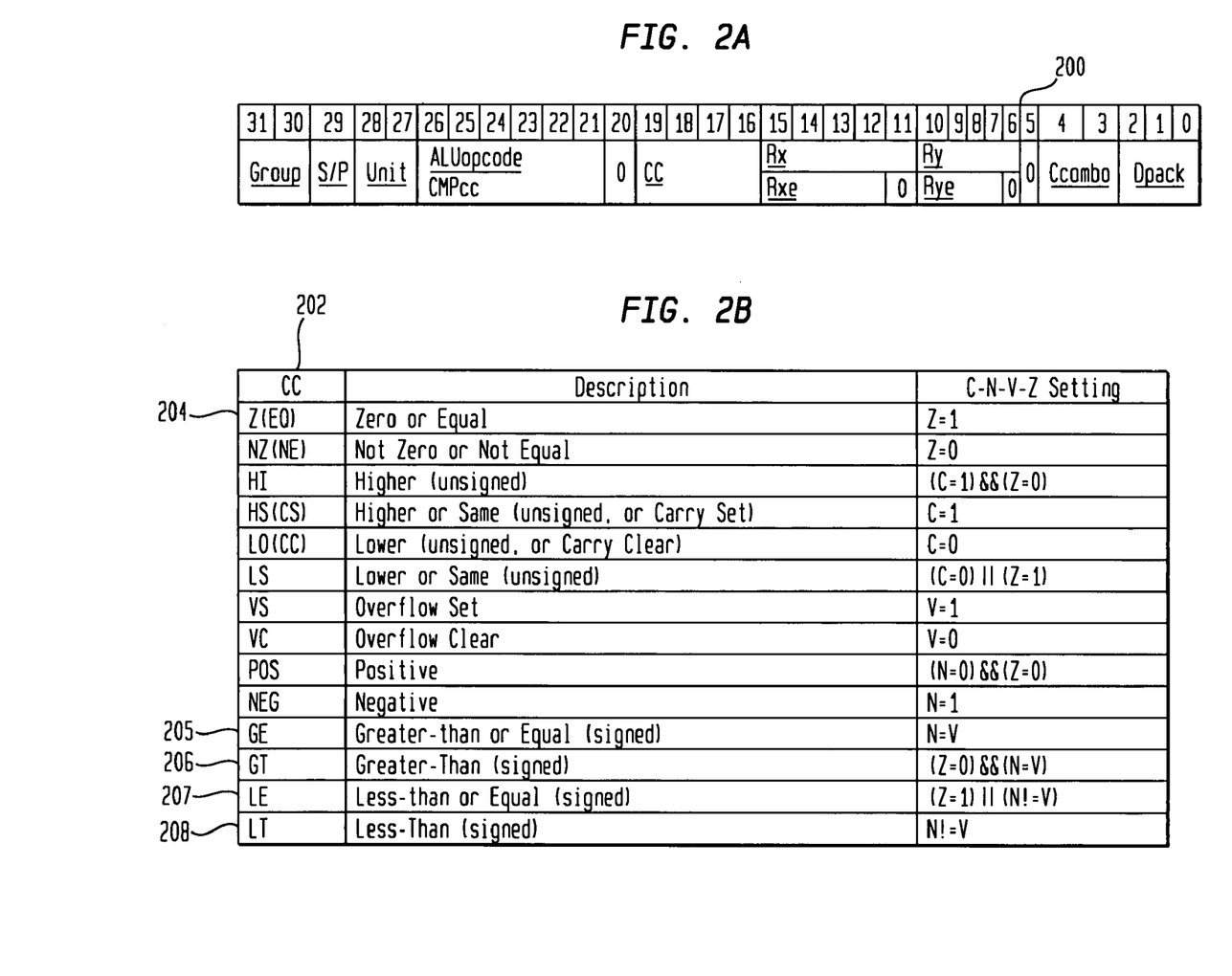
FIG. 2A illustrates an exemplary compare instruction encoding sequence in accordance with the present invention.
FIG. 2B illustrates an exemplary description of the CC bit field and the Ccombo field bits of the compare instruction of FIG. 2A.

A characteristic of the instruction set is the need for the programmer to specify how to set the ACF condition flags when using certain instructions. For ALU comparison instructions, such as instruction 20 as illustrated in FIG. 2A, the programmer must specify which condition test CC 202 of FIG. 2B, to use in setting the ACF F7-F0. For example, valid condition results such as Greater than or Equal (GE) 205 or Less than or Equal (LE) 207 can be specified to set the appropriate ACF. As shown in FIG. 2B, the || symbol represents a logical OR operation; the && symbols represent an AND operation; and the ! symbol represents Not Equal.

The architecture specifies an execute True, an execute False, an unconditional execute, and other specific operations on a per instruction basis, in a hierarchical fashion. The True and False flag settings are used for Execute if Condition is True and Execute if Condition is False operations. Branches may also occur based on the True or False condition state of these flags. For certain DSU instructions, Shift/Rotates, PEXCHG (a communication instruction), and selected other instructions, the ManArray architecture provides the ability to specify how to update the ACFs using one of the four scalar conditions C, V, N, or Z side effects on an instruction by instruction basis. When executing VLIW operations, the programmer must select which of the arithmetic units, presently only the ALU or DSU although it will be recognized this capability can be extended, controls the setting of the single set of flags. Each cycle, the setting of the condition flags is explicitly specified by the instruction.

Another characteristic of the ManArray instruction set is that instructions that execute conditionally do not affect the condition flags themselves. This feature gives the programmer the ability to execute C-style conditional expression operators of the form (a>b)?z=x+y:r=q+s without worrying that the first instruction after the comparison will alter the flags producing an undesired result. An instruction may either specify to conditionally execute based upon the ACFs or specify how to set the flags but not both.

Hierarchical Conditional Execution Instruction Formats

A hierarchical format for the specification of conditional execution is used in the ManArray instruction set architecture allowing a better utilization of instruction bits. A 3-bit, 2-bit or 1-bit subset opcode extension encoding is defined for each instruction that supports conditional execution. It should be noted again that the ASF scalar flags are always affected on b0, H0, W0, and D operations regardless of whether or not the ACFs are affected.

Arithmetic Condition Flags (ACFs) for Packed Operations

Figure 3A:
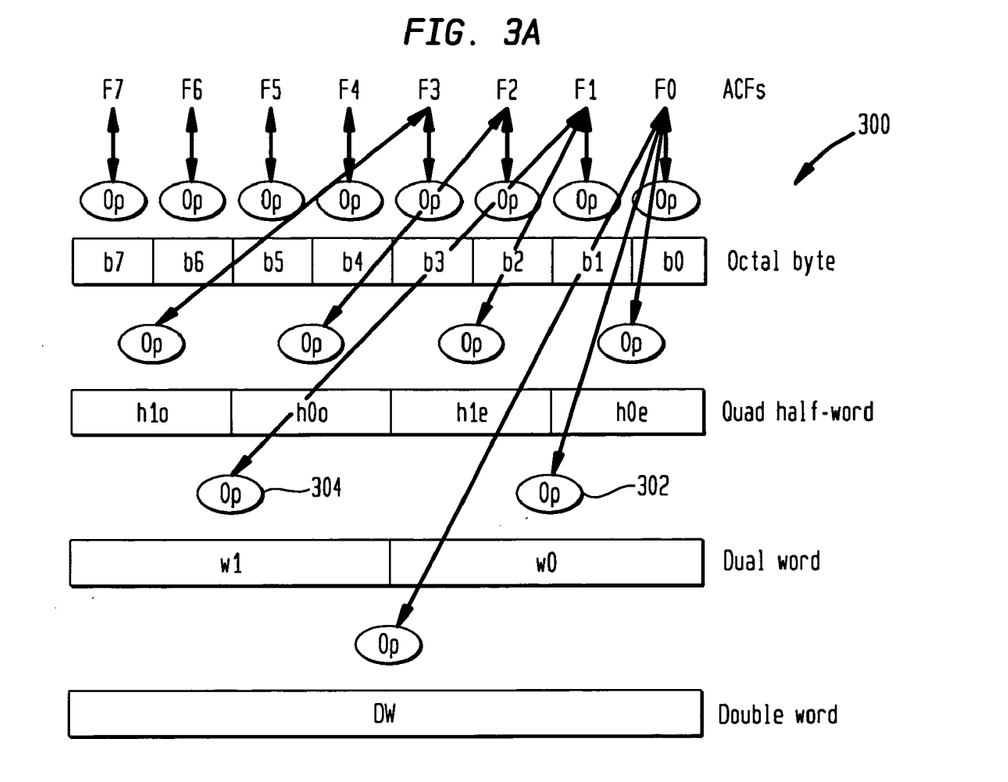
FIG. 3A illustrates 64-bit packed data type operations and their relationship to the arithmetic condition flags in accordance with the present invention.
Figure 3B:
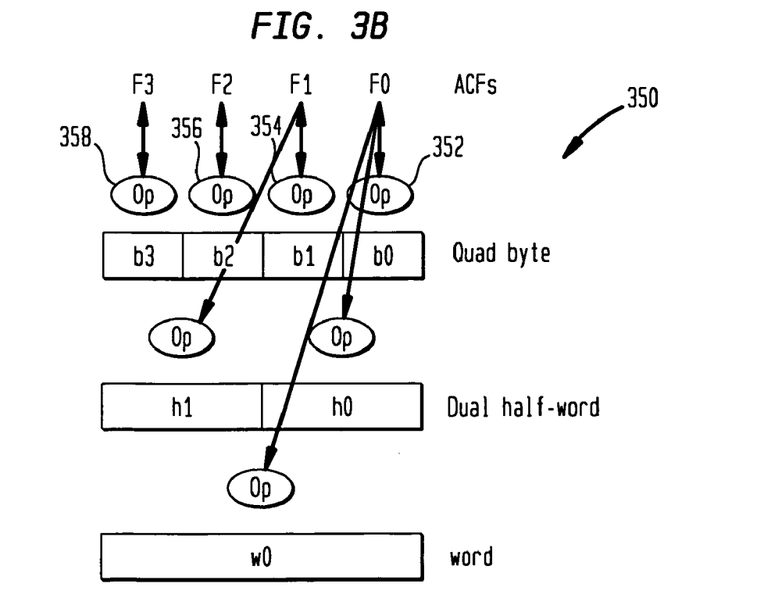
FIG. 3B illustrates 32-bit packed data type operations and their relationship to the arithmetic condition flags in accordance with the present invention.

A packed data operation is defined as executing the same operation on each of the multiple data elements specified by the instruction. Each of these individual data element operations can generate side effects that can set the appropriate ASF and/or ACF as defined by the packed data instruction. Since the ManArray architecture supports up to eight simultaneous packed data operations there are eight ACFs F0-F7 defined. There is a correspondence, as shown in Table 2 below, between the flags and the operation parallelism. The flags are affected as specified by the CCcode field in compare instructions and by the CE3a field, to be described in further detail below, in selected instructions. FIGS. 3A and 3B depict the relationship of a packed data element operation and its corresponding ACF. For example, in FIG. 3A, illustrating 64-bit packed data operations 300, in dual word operations, the operation 302 on W0 affects F0 and the operation 304 on W1 affects F1. In another example, in FIG. 3B, representing 32-bit packed data operations 350, in quad byte operations, the operation 352 on b0 affects F0, the operation 354 on b1 affects F1, the operation 356 on b2 affects F2, and the operation 358 on b3 affects F3.

CE1: One-Bit Conditional Execution Opcode Extension Encoding

Opcodes with a CE1 1-bit extension field as illustrated in Table 3 below, may conditionally execute on True or unconditionally execute without affecting the ACFs. The ASFs are set as defined by the instruction. For example, load and store instructions, such as instruction 400 of FIG. 4A, never affect ACF flags and they may be conditionally executed on a true condition.

TABLE 2

| Operation Parallelism | Supported Data types | ACFs Affected | ACFs Unaffected | Scalar Flags C, V, N, Z set by__ operation |
|---|---|---|---|---|
| 64-bit | 8 Bytes | F7(b7), F6(b6), F5(b5), F4(b4), F3(b3), F2(b2), F1(b1), F0(b0) | None | b0 |
| 32-bit | 4 Bytes | F3(b3), F2(b2), F1(b1), F0(b0) | F7–F4 | b0 |
| 64-bit | 4 Half-words | F3(H1o), F2(H0o), F1(H1e), F0(H0e) | F7–F4 | H0e |
| 32-bit | 2 Halfwords | F1(H1), F0(H0) | F7–F2 | H0 |
| 64-bit | 2 Words | F1(W1), F0(W0) | F7–F2 | W0 |
| 32-bit | 1 Word | F0(W) | F7–F1 | W |
| 64-bit | 1 Doubleword | F0(DW) | F7–F1 | D |

TABLE 3

| Encoding | Execution | Affect on ACFs | Example Instruction |
|---|---|---|---|
| 0 | Execute | DO NOT AFFECT | lim.s.h0 R0, 0xFFFF |
| 1 | Cond. Exec. If F0 is True | DO NOT AFFECT | T.lim.s.h0 R0, 0xFFFF |

CE2: Two-Bit Conditional Execution Opcode Extension Encoding

Figure 4A:
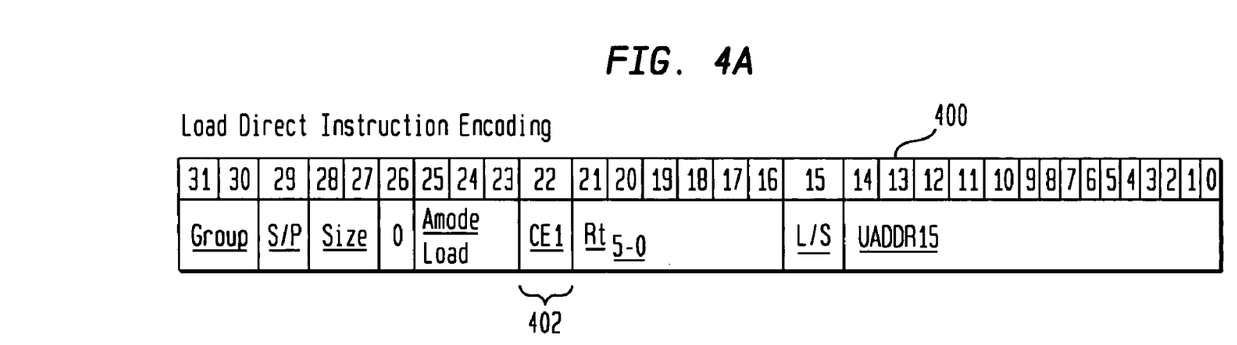
FIG. 4A illustrates an exemplary load direct instruction encoding sequence using the CE1 single-bit conditional execution specification of the present invention.
Figure 4B:
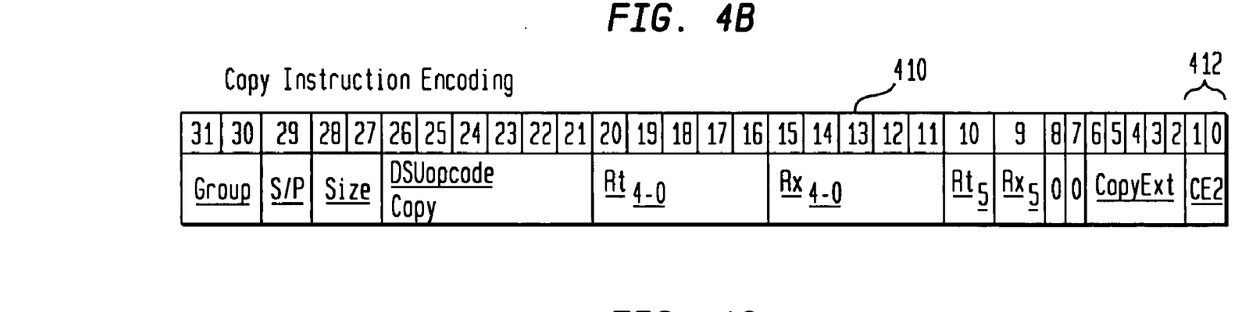
FIG. 4B illustrates an exemplary copy instruction encoding sequence using the CE2 two-bit conditional execution specification of the present invention.

Opcodes with a CE2 2-bit extension field as illustrated in Table 4 below may conditionally execute on true or false, unconditionally execute and not affect the ACFs or provide an instruction specific conditional execution function. The ASFs are set as defined by the instruction. An exemplary copy instruction encoding 410 with bits 0 and 1 comprising a CE2 2-bit extension field is shown in FIG. 4B.

TABLE 4

| Encoding | Execution | Affect on ACFs | Example Instruction |
|---|---|---|---|
| 00 | Execute | DO NOT AFFECT | copy.sd.w R0, R1 |
| 01 | Cond. Exec if F0 is True | DO NOT AFFECT | T.copy.sd.w R0, R1 |
| 10 | Cond. Exec if F0 is False | DO NOT AFFECT | F.copy.sd.w R0, R1 |
| 11 | Defined by instruction | Defined by instruction | See instructions |

CE3a: Three-Bit Conditional Execution Opcode Extension Encoding

DSU specific instructions Shift/Rotate, Receive-type, Floating-Point/Integer conversion instructions, and select others with a conditional execution CE3a 3-bit extension field as illustrated in Table 5 below, specify how the instruction is to be executed and how the ACFs are affected. The C, N, Z, and V flags represent the side effect from the instruction that is executing. Arithmetic instructions of the form A←X□Y or X←X□Y□Z where the □ is an arithmetic function, like +, −, *, logical OR, may be conditionally executed on a true or false condition without affecting the flags. They may be unconditionally executed without affecting the flags or unconditionally executed and affect the flags based on one of the conditions C, V, N, or Z.

TABLE 5

| Encoding | Execution | Affect on ACFs | Example Instruction |
|---|---|---|---|
| 000 | Execute | DO NOT AFFECT | add.sa.1w R0, R1, R2 |
| 001 | Cond. Exec if F0 is True | DO NOT AFFECT | T.add.sa.1w R0, R1, R2 |
| 010 | Cond. Exec if F0 is False | DO NOT AFFECT | F.add.sa.1w R0, R1, R2 |
| 011 | Reserved | Reserved | None |
| 100 | Execute | ACFs←Z | sprecvZ.pd.w R0, R1, 2x2PE0 |
| 101 | Execute | ACFs←N | sprecvN.pd.w R0, R1, 2x2PE1 |
| 110 | Execute | ACFs←V | shriV.sd.1w R0, R1, R2 |
| 111 | Execute | ACFs←C | shriC.pd.1w R0, R1, R2 |

CE3b: Three-Bit Conditional Execution Opcode Extension Encoding

Figure 4C:
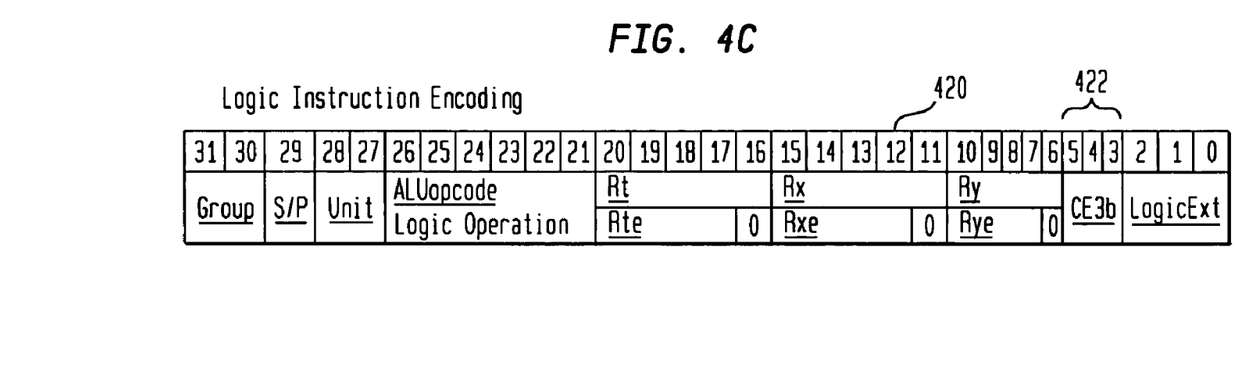
FIG. 4C illustrates an exemplary logic instruction encoding sequence using the CE3b three-bit conditional execution specification of the present invention.

There are three situations that are addressed with the CE3b 3-bit architecture. A first one is to unconditionally execute the operation. A second is to conditionally execute the operation on all packed data elements. A third is to select which data elements are to be conditionally operated upon. In the first case, the operation always occurs on all data elements. In the second case, the operation either occurs on all data elements or the operation does not occur at all. In the third case, the operation always occurs but only acts on those data elements that have a corresponding ACF of the appropriate value for the specified true or false coding. In this third case, the packed data instruction is considered to partially execute in that update of the destination register in the SP or in parallel in the PEs only occurs where the corresponding ACF is of the designated condition. All three approaches are available by using the CE3b encodings. An exemplary logic instruction encoding 420 with bits 3, 4 and 5 comprising a CE3b 3-bit extension field is shown in FIG. 4C.

The syntax defining the third case operations are "Tm" and "Fm." They stand for "True Multiple" and "False Multiple." The multiple case uses the data element count in the current instruction to determine the number of flags to be considered in the operation. For example, a Tm.add.sa.4h would execute the add instruction on each of the 4 halfwords based on the current settings of F0, F1, F2, and F3. This execution occurs regardless of how these four flags were set. This approach enables the testing of one data type with the operation on a second data type. For example, one could operate on quad bytes setting flags F3-F0, then a conditional quad half-word operation can be specified based on F3-F0. Certain instructions, primarily those in the MAU and ALU, allow a conditional execution CE3b 3-bit extension field to be specified. How the instruction is to be executed and how the ACFs are affected is shown in Table 6 below.

TABLE 6

| CE3b | Execution | Affect ACFs? | Example Instruction |
|---|---|---|---|
| 000 | Execute | Do Not Affect | add.sa.1w R0, R1, R2 |
| 001 | Cond. Exec if F0 is True | Do Not Affect | T.add.sa.1w R0, R1, R2 |
| 010 | Cond. Exec if F0 is False | Do Not Affect | F.add.sa.1w R0, R1, R2 |
| 011 | Reserved | Reserved | None |
| 100 | Cond. Exec on Multiple flags determined by the number of data elements in the current instruction, if Fn is True operate on the corresponding data element. | Do Not Affect | Tm.add.sa.4h R0, R2, R4 |
| 101 | Cond. Exec on Multiple flags determined by the number of data elements in the current instruction, if Fn is False operate on the corresponding data element. | Do Not Affect | Fm.add.sa.4h R0, R2, R4 |
| 110 | Reserved | Do Not Affect | Reserved |
| 111 | Reserved | Do Not Affect | Reserved |

The rationale for including the 100 and 101 encodings are similar to the 001 and 010 encodings. In other words, this feature gives the programmer the ability to execute C-style conditional expression operators of the form (a>b)?z=x+y:r=q+s where a, b, x, y, z, q, r, and s are all packed data vector elements.

Conditional Branch Type Instructions

The ManArray architecture as described herein supports both unconditional and conditional branch-type instructions in the SP based upon the scalar condition flags C,V,N, or Z as well as the ACFs. Since the condition code for setting the ACFs is specified in the compare instruction, as well as other specifically defined instructions as shown in FIG. 2B, the conditional branch need only specify branch on true or branch on false though control code may make use of scalar conditional branch instructions. To accommodate multiple conditions generated by instructions on packed data, a branch instruction must also specify a reduction operation of All (AND reduce) or Any (OR reduce). Instructions on non-packed single data (MONO) operations are treated as a subset of packed data operations for orthogonality although the two reductions are equivalent when there is only one operation.

Table 7 represents one suitable reduction method. Here again, the multiple concept is utilized. The syntax format is as shown in Table 7 below where the number of flags to be considered are specified by the 2, 4, and 8 digits in the syntax.

TABLE 7

| Instruction Specification | Programmer Interpretation |
|---|---|
| [TF].op | T: if (F0 = 1) F: if (F0 = 0) |
| [TF].opANY.2 | T: if (any F1–F0 = 1) F: if (all F1–F0 = 0) |
| [TF].opALL.2 | T: if (all F1–F0 = 1) F: if (any F1–F0 = 0) |
| [TF].opANY.4 | T: if (any F3–F0 = 1) F: if (all F3–F0 = 0) |
| [TF].opALL.4 | T: if (all F3–F0 = 1) F: if (any F3–F0 = 0) |
| [TF].opANY.8 | T: if (any F7–F0 = 1) F: if (all F7–F0 = 0) |
| [TF].opALL.8 | T: if (all F7–F0 = 1) F: if (any F7–F0 = 0) |

Compare Instructions

Comparison instructions are always executed and always affect the flags. General-purpose flags (ACFs) are affected based on the condition code specified as part of the comparison instruction. Using condition combination, the previous state of the flags can be combined with the result of the condition code test specified by the current compare instruction. This approach allows complex conditions to be created without resorting to multiple branching. In FIG. 2B, CC stands for a condition code 202 such as Greater Than (GT) 206, Less Than (LT) 208, Equal (EQ) 204, or Less Than or Equal (LEQ) 207. The Compare (CMPcc) instruction 200 in FIG. 2A specifies the desired conditions CC, FIG. 2B, to be tested, the two source registers to be compared, the data type covering packed forms, and a Boolean combination specification field labeled CCombo.

In Table 8 below, $F_{t, n}$ designates the "n" T/F condition flags (F) generated on cycle t. Specifically, the letter "n" represents the set of ACFs n=1: F0, n=2: F1–F0, n=4: F3–F0, or n=8: F7–F0 depending on whether the compare instruction is mono, dual, quad, or octal respectively. $F_{t-1, n}$ designates the state of the ACFs on the previous cycle, as indicated by the t−1 subscript. $F_n$ represents the final set of true/false values that the set of n machine ACFs takes upon completion of the compare operation. This condition flag encoding is shown in Table 8 below.

TABLE 8

| Encoding | Combination | Operation |
|---|---|---|
| 00 | none | $F_n \leftarrow F_{t,n}$ |
| 01 | AND | $F_n \leftarrow F_{t-1,n}$ AND $F_{t,n}$ |
| 10 | OR | $F_n \leftarrow F_{t-1,n}$ OR $F_{t,n}$ |
| 11 | XOR | $F_n \leftarrow F_{t-1,n}$ XOR $F_{t,n}$ |

Condition combination allows the programmer to branch in the SP or conditionally execute in the SP and PEs on a Boolean combination of multiple conditions. This approach can be used in lieu of multiple branches and their associated penalty which are necessary to achieve the same effect without condition combination. Conditional execution may also take place of based on a combination of multiple conditions rather than a single condition. Finally, condition combination can be used in conjunction with a preceding arithmetic instruction to generate a complex condition that is not directly available from the limited set of arithmetic instruction condition codes. It is noted that combined conditions of arbitrary complexity may be obtained by copying the condition flags to any one of the many processor registers and then performing logical operations upon them in the arithmetic unit. After the desired condition has been computed and stored in the register, it can be copied back to the condition flags whereupon it may be used for conditional execution. Using this methodology, an extremely general method of obtaining complex conditions is obtained at the expense of some programming overhead. This methodology can also be used to support the nesting of C-style conditionally executed statements which requires multiple sets of condition results which could be generated and reside in the compute-register file. These condition results residing in the processor register file would then be copied to the ACFs prior to conditional execution.

VLIW Conditional Execution

Each instruction stored in the VLIW memory (VIM) contains its CE1, CE2, or CE3a/b specification. When the VLIW is read out for execution in response to an execute-VLIW (XV) instruction, multiple flags internal to the individual units can be generated. Since there is one set of ACFs and potentially each instruction in the VLIW could affect the flags, a selection mechanism is needed to choose which arithmetic unit will affect the flags for any given cycle. There are two mechanisms for achieving this in one embodiment of the ManArray in accordance with the present invention. These mechanisms cater to the needs of SIMD and Synchronous Multiple Instruction Multiple Data stream (SMIMD) code, respectively.

In SMIMD, a different VLIW can exist at the same VIM address which can then be executed in parallel for purposes of optimizing performance in different applications with varying needs for VLIW parallelism. For SMIMD code, the programmer specifies which arithmetic unit affects the flags when the VLIW is loaded as part of the Load VLIW (LV) instruction. This approach allows different PEs to have different units affect the flags. For SIMD code, the programmer specifies which unit affects the flags at execution time as part of the XV instruction. The XV instruction specification may override the unit specified in the LV instruction. This allows the programmer to pack multiple non-overlapping VLIWs in the same VIM address with different arithmetic units affecting the condition flags per VLIW execution.

Transmitting Condition Flags Between PEs

The PE DSU receive instruction (PEXCHG) specifies the communication operation between PEs. By allowing the PEXCHG instruction to have access to the programmer visible status register containing the ACFs and ASFs it is possible to efficiently transfer condition-state information from one PE to another. The SP receive instruction (SPRECV) can be used to transmit conditions between the PEs and the SP. The condition state would be received into the compute-register file of a different PE and can then be copied to its own programmer visible flag register and used for conditional execution.

Expanded Conditional Execution Definition

Each instruction currently having a CE3 field 422, FIG. 4C, or a CE2 field 412, FIG. 4B, has at least one encoding reserved as illustrated in Table 5 and 6 and Table 4, respectively. The following mechanism would use this reserved encoding to allow the instruction to update the arithmetic condition flags (F7-F0) with a programmable "compound condition" specified by a "SetCC" instruction. As an example, the CE2 encodings for utilizing the reserved field are shown in Table 9 below. CE3a and CE3b fields would both use the same encoding definition for their equivalent reserved encoding.

TABLE 9

| Encoding | Execution | Affect on ACFs |
|---|---|---|
| 00 | Execute | DO NOT AFFECT |
| 01 | Cond. Exec if F0 is True | DO NOT AFFECT |
| 10 | Cond. Exec if F0 is False | DO NOT AFFECT |
| 11 | Execute ACF ← Compound Condition | Compound Condition Defined by SetCC instruction |

The SetCC instruction specifies a compound condition to be generated and saved in the arithmetic condition flags (F7-F0) of a particular execution unit when an instruction for that unit specifies this type of condition generation. The currently preferred CE3a encoding allows the specification of one of four possible conditions: C (carry), N (negative), V (overflow) or Z (zero). The SetCC instruction allows up to 32 compound conditions to be specified, including the standard 16 conditions such as greater than, less than or equal, higher or the same, and the like. For example, a condition can be specified to detect whether an overflow occurred on any data operation within a packed data execution. In this way, data operation six having an overflow within an octal packed data execution could cause flag ACFF6 to be set. Any of these may be selected by an instruction having the CE3 or CE2 encoding that can affect conditions. It is also possible to make the SetCC instruction conditionally executable based upon some data so that the selection of different compound conditions can be data dependent. An exemplary SetCC instruction is shown in Table 10 below.

TABLE 10

| SetCC opcode | Select Execute Unit to affect ACFs: ALU, MAU, DSU, ALL . . . (3bits) | Select Compound Condition (5 bits) |
|---|---|---|

The SetCC instruction, identified by its opcode encoding, specifies the following two parameters:

Execute Unit: This field specifies to which execution unit the specified compound condition applies. Each execution unit may have a different compound condition or if the ALL encoding is chosen then all units use the same compound condition.

Selected Condition: This field specifies one of 32 conditions. Assuming the instruction format allows it, this field could be expanded if other conditions arise that should be tested.

Conditional Execution Apparatus

Figure 5A:
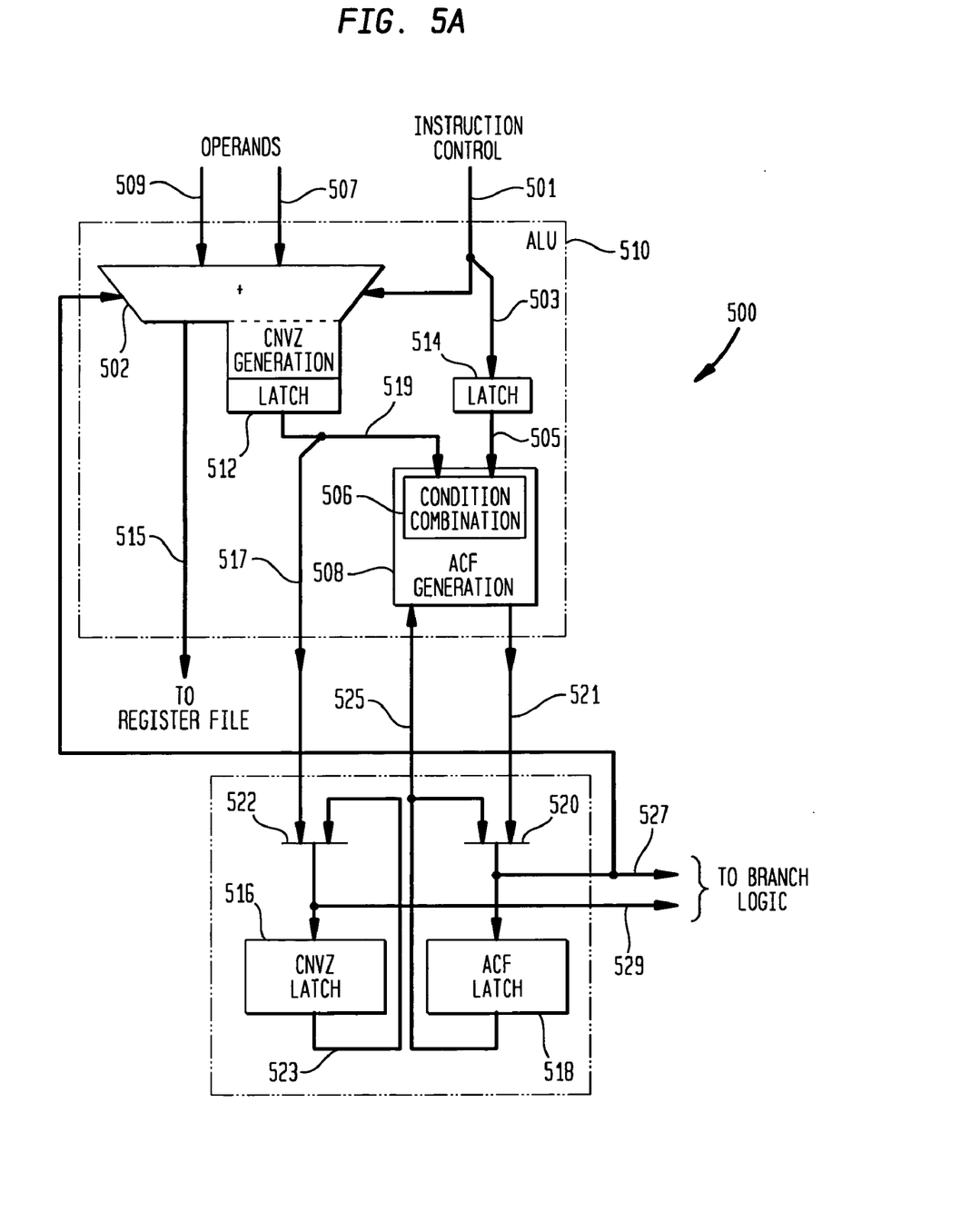
FIG. 5A illustrates details of one suitable implementation of hardware for implementing conditional execution in accordance with the present invention.

FIG. 5A illustrates aspects of conditional processing hardware 500 suitable for implementation of conditional processing in accordance with the present invention. The hardware 500 includes an arithmetic unit 510, for example an arithmetic logic unit (ALU), or other execution unit of the ManArray architecture of FIG. 1. The ALU 510 receives operands 507 and 509 from the ManArray register file. The instruction control lines 501 are derived from the registered instruction in the processor pipeline. The instruction control lines include conditional execution control lines 503 to control conditional operation as specified in the instruction. FIG. 4A shows exemplary load direct instruction 400 with bit 22 comprising the CE1 field 402. FIG. 4B shows the exemplary copy instruction 410 with bits 1 and 0 representing CE2 field 412. FIG. 4C shows the exemplary logic instruction 420 with bits 5–3 representing CE3b field 422. The operative unit within the arithmetic unit 510, for example an adder 502, produces a result 515 and a latched arithmetic scalar condition state 519. The latches 512 and 514 hold the latch input values at the end of the execute cycle and so represent the arithmetic scalar conditions and instruction control signals for an instruction that has finished its execution cycle. It is noted that the pipeline for the execution units can vary depending upon the implementation and consequently pipeline effects must be accounted for to achieve the desired conditional operation. The result 515 is sent to the processor's or processing element's register file. The arithmetic scalar condition signals 519 are further processed in the ACF generation unit 508 by a signal selection and condition combination unit 506 as dictated by the controls 505 for the instruction that executed. The output of the ACF generation unit 521 represents the ACFs generation signals F7-F0 prior to their being stored in the programmer visible register 518. The ACF generation unit for selected instruction also provides a Boolean combination of the present selected state with the previous state 525. It is noted that as indicated above many instructions do not affect the flags, as specified by the architecture. In these no-affect cases, the flags remain as previously set. Multiplexer 520 selects either the ACF generation signals 521 or the ACF latch 518 output 525 to be used as an output 527 for conditional test in the arithmetic unit to control whether to write the result output 515 in the register file dependent upon the results of the test specified in the instruction under execution. The multiplexer 520 output 527 is sent to the branch logic in the SP only and latched in the next cycle in latches 518 that represent programmer visible status bits. In a similar manner, multiplexer 522 selects either a portion of the latched CNVZ latch outputs 517 or the CNVZ latch 516 output 523 to be sent to the branch logic in the SP only and latched in the next cycle in the latches 516 that represent programmer visible status bits. These bits in latches 516 and 518 can be combined in a common programmer visible status register where the CNVZ 516 values are placed into bits 19–16 respectively of the programmer's visible Status and Control Register 0 (SCR0) and the ACF F7-F0 518 values are placed into bits 7–0 respectively as shown in Table 11 below.

TABLE 11

The 32-bit Status and Control Register 0 (SCR0) contains the primary status and control information.
Blank fields are reserved.

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | C | N | V | Z | | | | | | | | | F7 | F6 | F5 | F4 | F3 | F2 | F1 | F0 |

Figure 5B:
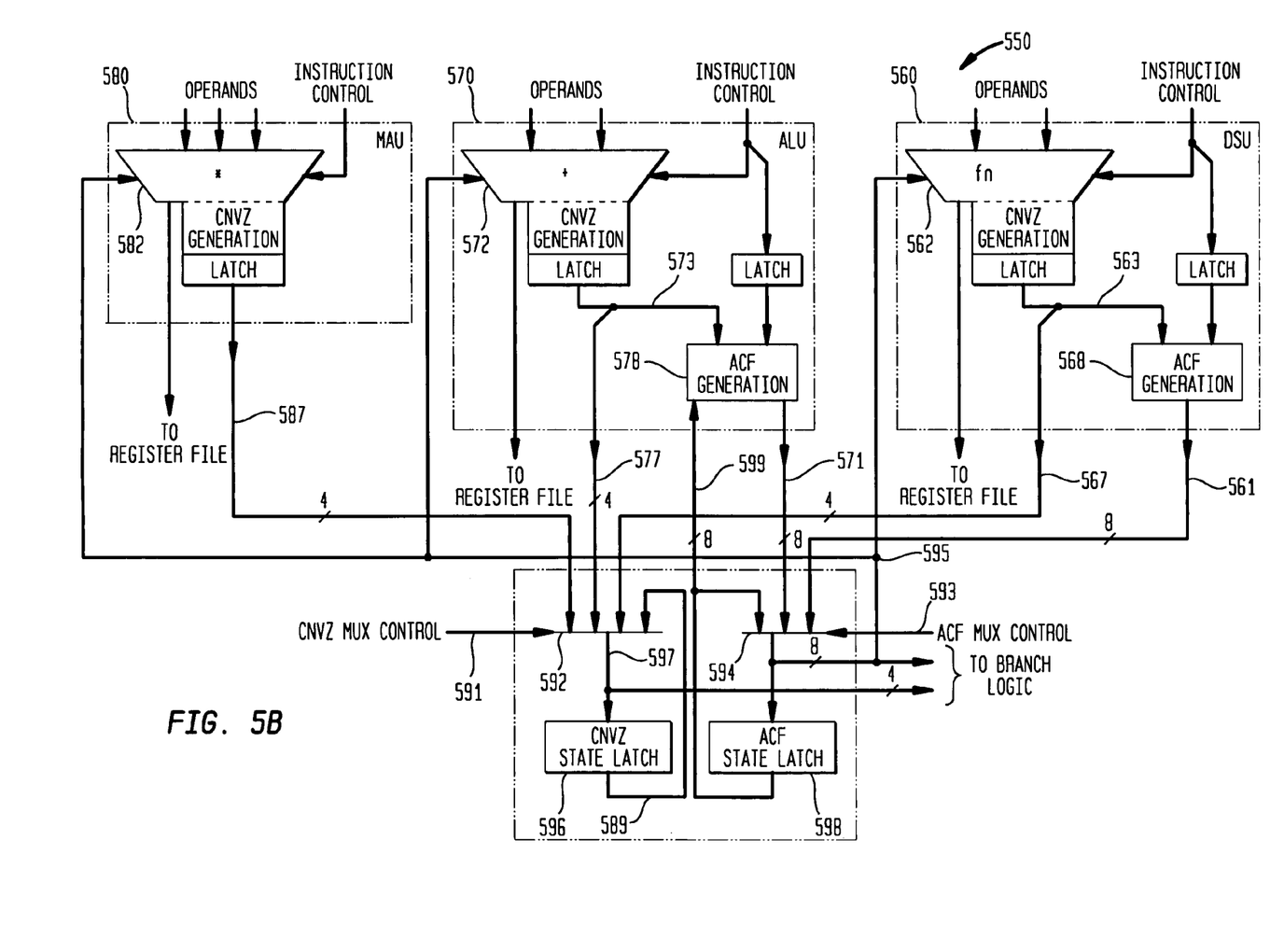
FIG. 5B illustrates further details of one suitable implementation of hardware for implementing conditional execution in a VLIW processor in accordance with the present invention.

In the ManArray processor, the concept represented in FIG. 5A is extended to the VLIW architecture as shown in FIG. 5B. In FIG. 5B, a conditional execution VLIW unit 550 is shown containing three execution units, a Data Select Unit (DSU) 560, an ALU 570, and a Multiply Accumulate Unit (MAU) 580. This hardware is incorporated in the SP and in each PE of a ManArray processor such as processor 100 shown in FIG. 1. Internal to these units are the basic operative elements and their ASF generation and latch units namely in the DSU 560 functional unit fn 562, in the ALU adder 572, and in the MAU multiplier 582. Three types of flag functionality are shown to demonstrate the versatility of the concept and are representative of typical application needs. In the DSU 560, the ASF, (C N V Z), are generated as required by DSU instructions. The ACFs 561 are generated in AFC generation unit 568 based upon the ASFs 563 with no feedback of stored ACF state from the programmer visible latches 598. The ALU 570 maintains the functionality of the approach illustrated in FIG. 5A. In the ALU 570, the ACFs 571 are generated in ACF generation unit 578 based upon the ASFs 573 and stored ACF state 599 fed back from the programmer visible latches 598. The MAU 580 utilizes a relatively simple mechanism with no ACFs being generated as a result of an MAU instruction. The MAU is not precluded in general from setting the ACFs as shown by this exemplary implementation. Only the architecturally defined ASFs, (C N V Z), 587 for the least-significant operation of an MAU instruction that affects these flags, are sent to multiplexer 592 where if selected they would pass through to multiplexer output 597 and be latched in programmer visible state latches 596. The multiplexer 592 selects the ASFs generated from the MAU 587, from the ALU 577, from the DSU 567, or from the CNVZ state latch 589 as controlled by the CNVZ mux control signal 591. For VLIW execution, the Unit Affecting Flags (UAF) field in the load VLIW (LV) instructions, a 2 bit field in the present ManArray architecture, in conjunction with the UAF of an XV instruction determines the multiplexer control signals 591 and ACF Mux Control 593 as follows. The LV instruction's Unit Affecting Flags (UAF) bits are used to select which arithmetic instruction slot (A=ALU, M=MAU, D=DSU) is allowed to set condition flags for the specified VLIW when it is executed. The XV instruction's Unit Affecting Flags (UAF) bits override the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified via the LV instruction as these are loaded in the VIM at the specified VLIW address. In the instruction syntax, a flag parameter is used to specify the UAF for the instruction. A blank parameter, i.e. 'F=', selects the UAF specified when the VLIW was loaded to be used for the instruction execution and consequent control of the multiplexers 592 and 594 to load the proper flags into the programmer visible registers 596 and 598. For example, with the UAF indicating the MAU is to affect the flags, multiplexer 592 selects in response to CNVZ Mux Control 591 signal, path 587 to pass through to multiplexer output 597 to load the generated CNVZ ASFs to CNVZ state latches 596. Since the MAU does not generate any ACFs as shown in the exemplary MAU 580, no ACFs are to be latched into the programmer visible ACF State Latches 598 and they retain their previous state. The MAU may still conditionally execute based upon the ACF values generated by another execution unit 595 following its pipeline sequence. If no instruction sequence requires the CNVZ or ACF state latches 596 and 598 respectively to be updated by any execution unit, then the mux control signals 591 and 593 cause the multiplexers 592 and 594 to select the state latch outputs 589 and 599 to pass through to their multiplexer outputs 597 and 595 respectively. For the ManArray implementation, the bus widths for the CNVZ and ACF signals are shown in FIG. 5B where the CNVZ paths 587, 577, and 567 are all 4 bit signals corresponding to the C, N, V, and Z values. The ACF paths 571 and 561 are each 8 bit signals corresponding to F7-F0. The outputs of the multiplexers 592 and 594 are the 4 bit signal and the 8 bit signals, respectively, both of which are used in the branch logic. The ACF multiplexer output signals 595 are used to control conditional execution in each of the execution units 560, 570, and 580. In the SP, only the multiplexer output signals 595 and 597 are used in the branch logic for conditional branch execution.

The ManArray architecture defines the ACF state latches 598 and the CNVZ state latches 596 to be stored in one of the programmer visible status and control registers which can be loaded by a load immediate instruction, loaded from memory, or copied from a compute register. This register can also be saved in memory and copied to one of the compute registers available to the execution units.

Utilizing the above described methods and apparatus for implementing condition flag information and the instruction encodings for conditional execution, it can be seen that condition execution is supported with as little as 1 bit of additional opcode space and up to 3 bits with varying degrees of functionality. In addition, a better match between instruction function specification and conditional execution specification can be obtained. For example, a 1 bit conditional execution encoding is sufficient for load and store instructions, allowing a maximum number of bits for function encoding. Each added conditional execute bit provides a superset of the previous functionality. Further, with this approach, the overall number of condition bits is reduced. This maps well with instructions that operate on packed data with one flag being defined for each sub-word operation, allowing partial execution of instructions on a sub-word basis.

A further condition flag reduction is specified where all of the execution units in a VLIW share the same condition flags. By use of the ManArray network and communication instructions, it is possible to allow instructions that execute in different PEs to utilize each others condition information. In addition, with condition combination, the use of multiple branches for complex condition cases may be avoided and complex conditions can be used for conditional execution.

While the present invention has been described in a presently preferred embodiment, it will be recognized that the teachings of the present invention may be advantageously applied to a variety of processing arrays consistent with the claims which follow.

We claim:

1. A method of supporting conditional execution in a very long instruction word (VLIW) based array processor, the method comprising:
   executing a first instruction that identifies an execution unit from a plurality of execution units as the identified execution unit affecting the value of an arithmetic condition flag (ACF), wherein the identified execution unit is associated with a second instruction in a VLIW;
   executing the second instruction by the identified execution unit, the second instruction identifying a condition resulting from the execution of the second instruction; and
   setting the identified condition in the ACF.

2. The method of claim 1 wherein instructions that execute conditionally do not affect the ACFs.

3. The method of claim 1 further comprising the steps of:
   executing a packed data instruction where the execution of each sub-word of the packed data operation is dependent upon the associated subword ACF.

4. The method of claim 1 further comprising:
   executing a third instruction following the execution of the second instruction, the third instruction based on the ACF having a bit field that selects the value of the ACF to determine whether to execute the third instruction or not.

5. The method of claim 4 wherein the third instruction is an arithmetic logic unit (ALU), multiply accumulate unit (MAU), data select unit (DSU), a load, or a store instruction.

6. The method of claim 1 wherein the first instruction is an execute VLIW (XV) instruction.

7. The method of claim 1 wherein the first instruction is a load VLIW (LV) instruct.

8. The method of claim 1 wherein the execution unit affecting the value of an arithmetic condition flag (ACF) is identified by a unit affecting field (UAF) bit field in the first instruction.

9. The method of claim 1 wherein the second instruction is a compare instruction.

10. The method of claim 1 wherein the second instruction is an arithmetic logic unit (ALU), multiply accumulate unit (MAU), or data select unit (DSU) instruction.

11. An indirect very long instruction word (VLIW) processing system comprising:
    a first processing element (PE) having a VLIW instruction memory (VIM) for storing instructions in slots within a VIM memory locations;
    a first register for storing a function instruction having a plurality of group bits defining instruction type and a plurality of unit field bits defining execution unit type;
    a predecoder for decoding the plurality of group bits and the plurality of unit field bits; and
    a load mechanism for loading the function instruction in an appropriate one of said slots in VIM based upon said decoding, the first processor farther comprising:
    at least two execution units, each execution unit receiving at least two operands from a register file;
    each execution unit having instruction control lines derived from a registered instruction in a processor pipeline, the instruction control lines including conditional execution control lines to control conditional operation as specified in an instruction to be executed;

each execution unit producing a result and a latched arithmetic scalar condition state;

each execution unit having a first latch for holding the arithmetic scalar condition state for the instruction after the instruction has finished its execution state;

each execution unit having a second latch connected to the conditional execution control lines for holding instruction control signals for the instruction after the instruction has finished its execution state;

each execution unit having an arithmetic condition flag (ACF) generation unit for providing a Boolean combination of a present selected state with a previous state; and a single ACF latch for all of the execution units for storing the previous state and feeding the previous state back to the respective ACF generation unit.

12. The system of claim 11 wherein the PE further comprises a multiplexer connected to receive said Boolean combination from each of the ACE generation units and to controllably switch said Boolean combinations to branch logic in a sequence processor (SP).

13. An apparatus for supporting conditional execution in a very long instruction word (VLIW) based array processor, the apparatus comprising:
a processing element (PE) for providing arithmetic condition flags (ACFs), the PE having a plurality of execution units that produce condition as a result of the execution units executing;
a first instruction identifying one of the execution units as the identified execution unit to affect the value of an ACF; and
a second instruction having a condition code specification encoded therein identifying a condition from the identified execution unit, the processing element setting the identified condition in ACEs upon execution of the second instruction.

14. The apparatus of claim 13 wherein instructions that execute conditionally do not affect the ACFs.

15. The apparatus of claim 13 further comprising the steps of:
executing a packed data instruction where the execution of each sub-word of the packed data operation is dependent upon the associated subword ACF.

16. An indirect very long instruction word (VLIW) processing system comprising:
a fetch controller;
a VLIW instruction memory (VIM);
a processing element (PE) having a VIM controller, and a plurality of execution units, the VIM controller receiving a VLIW instruction from the fetch controller and generating VIM addresses for segmenting the VLIW instruction and storing the segmented VLIW instruction into slots within a VIM memory location, each slot corresponding to each execution unit;
each execution unit having a plurality of instruction control lines through which to load an instruction stored in the execution unit's corresponding slot, a portion of said plurality of instruction control lines carrying an instruction control signal for controlling conditional operation as specified in the loaded instruction, each execution unit receiving as input at least two operands and an arithmetic condition flag (ACF), the ACF representing a previous state of the processing element, each execution unit producing a result defining an execution state; and
an ACF latch connected to each execution unit, the ACE latch storing the previous state and feeding the previous state back to each execution unit.

17. The indirect VLIW processing system of claim 16 wherein each execution unit producing an arithmetic scalar condition state.

18. The indirect VLIW processing system of claim 17 wherein each execution unit further comprises a first latch storing the arithmetic scalar condition state.

19. The indirect VLIW processing system of claim 18 wherein at least one of said plurality of execution units further comprises a second latch connected to the portion of said plurality of instruction control lines for holding the instruction control signal for the instruction after the instruction has finished its execution state.

20. The indirect VLIW processing system of claim 19 wherein the at least one of said plurality of execution units further comprises an ACF generation unit for providing a Boolean combination of a present selected state with a previous state.

21. The indirect VLIW processing system of claim 20 wherein the PE further comprises a multiplexer connected to receive said Boolean combination from each of the ACF generation units and to controllably switch said Boolean combinations to branch logic in a sequence processor (SP).

22. A method of supporting conditional execution in a very long instruction word (VLIW) based array processor, the VLIW based array processor having a processor element, the method comprising:
receiving a VLIW instruction;
generating VIM addresses for segmenting the VLIW instruction and storing the segmented VLIW instruction into slots within a VIM memory location;
loading an instruction stored in one of the slots;
receiving an instruction control signal for controlling conditional operation as specified in the loaded instruction;
receiving as input at least two operands and an arithmetic condition flag (ACF), the ACF representing a previous condition state of the processing element;
producing a result based on the loaded instruction, said at least two operands and the ACF, the result defining an execution condition state of the instruction; and
storing the condition state in the ACF to be used as the previous condition state of the processing element for a subsequent producing step.

23. The method of claim 22 wherein the producing step further comprises producing an arithmetic scalar condition state.

24. The method of 23 wherein the storing step further comprises stonng the arithmetic scalar condition state.

25. The method of claim 24 wherein the storing step a latch is used for storing the instruction control signal for the instruction after the instruction has entered the execution state.

26. The method of claim 25 wherein the producing step further comprises providing a Boolean combination of a present selected state with a previous state.

* * * * *